United States Patent [19]
Murphy

[11] Patent Number: 6,110,407
[45] Date of Patent: *Aug. 29, 2000

[54] METHODS OF MANUFACTURING DIPPED BLADDER MOLDING MANDRELS FOR MANUFACTURING TUBULAR SHAFTS

[75] Inventor: James M. Murphy, Oceanside, Calif.

[73] Assignee: Callaway Golf Company, Carlsbad, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,229

[22] Filed: May 2, 1997

[51] Int. Cl.[7] ............................... B28B 7/32; B32B 31/04
[52] U.S. Cl. .......................... 264/219; 264/225; 264/301; 264/308; 264/314; 264/257; 264/258; 249/65; 249/178
[58] Field of Search ..................... 264/219, 225, 264/301, 308, 516, 257, 258, 314, 263, 264, 279, 279.1; 249/65, 178

[56] References Cited

U.S. PATENT DOCUMENTS

| | | |
|---|---|---|
| 3,561,639 | 2/1971 | Allen . |
| 3,782,588 | 1/1974 | Allen . |
| 4,051,284 | 9/1977 | Ohkubo et al. . |
| 4,113,825 | 9/1978 | Hill et al. . |
| 4,144,632 | 3/1979 | Stroupe . |
| 4,397,048 | 8/1983 | Brown et al. ................................... 3/2 |
| 4,775,567 | 10/1988 | Harkness ................... 428/40 |
| 4,828,781 | 5/1989 | Duplessis et al. . |
| 4,853,172 | 8/1989 | Jacaruso et al. . |
| 4,937,025 | 6/1990 | Foster et al. . |
| 5,005,754 | 4/1991 | Van Overloop .......................... 227/178 |
| 5,071,506 | 12/1991 | Nelson et al. ........................... 156/441 |
| 5,137,208 | 8/1992 | Wang et al. ............................. 229/102 |
| 5,225,016 | 7/1993 | Sarh ......................................... 156/156 |
| 5,314,653 | 5/1994 | Haralambopoulos . |
| 5,360,590 | 11/1994 | Wheeler . |
| 5,368,807 | 11/1994 | Lindsay . |
| 5,460,675 | 10/1995 | Moser . |
| 5,505,492 | 4/1996 | Nelson et al. .......................... 280/819 |
| 5,510,911 | 4/1996 | Sharpe et al. ............................... 359/1 |
| 5,814,268 | 9/1998 | Banchelin et al. ...................... 264/516 |

FOREIGN PATENT DOCUMENTS 2250466A  6/1992  United Kingdom .

*Primary Examiner*—Jill L. Heitbrink
*Assistant Examiner*—Suzanne E. McDowell
*Attorney, Agent, or Firm*—Lyon & Lyon LLP; Michael A. Catania

[57] ABSTRACT

The present invention relates to an improved apparatus and method for manufacturing shafts from composite materials, particularly shafts for golf clubs. An elongate mandrel, having a passage therein and having a plurality of holes between the passage and an outer surface of the mandrel, includes a flexible bladder, preferably latex, dipped and cured directly on the outer surface of the mandrel. A set of plies of pre-preg composite sheet is wrapped around the mandrel in a predetermined manner. The wrapped mandrel is placed in a mold, the bladder is inflated to a predetermined pressure. The pressurized wrapped mandrel is then heated for a predetermined period of time to cure the composite material to form a shaft, preferably for a golf club. While the shaft is cured in the mold, gas of a predetermined pressure is introduced through the passage in the mandrel to inflate the bladder and force the composite sheet against the walls of the mold.

12 Claims, 1 Drawing Sheet

METHODS OF MANUFACTURING DIPPED BLADDER MOLDING MANDRELS FOR MANUFACTURING TUBULAR SHAFTS

FIELD OF THE INVENTION

The present invention relates generally to the manufacturing of tubular shafts from composite materials, more particularly to a molding mandrel having an inflatable bladder dipped and cured directly thereon used to produce tubular shafts such as for golf clubs, fishing poles, and/or pool cues, and methods of manufacturing the same.

BACKGROUND

Recently, substantial attention has been directed toward the development of lightweight tubular shafts, such as shafts for golf clubs, fishing poles, and/or pool cues manufactured from various composite materials, particularly from "pre-preg" material. Pre-preg composite sheets are formed by pre-impregnating fabric or strands of fiber, for example carbon or glass, within a binding matrix, such as epoxy resin. The binding matrix or resin is partially cured such that it holds the fibers together and forms a malleable sheet.

Shafts may be manufactured by wrapping in a predetermined way a set of plies of pre-preg composite sheet around a molding mandrel having an inflatable bladder thereon, placing the mandrel and plies in a mold having inner wall(s) of a desired shape and size, and heating the ply-wrapped mandrel to a predetermined temperature for a time sufficient to allow the resin comprising the plies of pre-preg composite sheet to completely cure. Generally, the molding mandrel used in such a process is a long rod having a hollow end and a plurality of holes communicating between the outer surface of the mandrel and the hollow end.

The inflatable bladder, typically of a latex material, is stretched over the mandrel prior to wrapping the mandrel with pre-preg material. The bladder covers the holes communicating the outer surface of the mandrel with its hollow end. The bladder covered mandrel is then wrapped with pre-preg material. While the ply-wrapped mandrel is cured in the mold (e.g. typically by heating), pressurized gas is introduced into the hollow end, the gas communicates through the holes and inflates the bladder to a predetermined pressure to force the plies of pre-preg against the inner wall(s) of the mold. After the shaft is cured, the mandrel and bladder are removed. The bladder is discarded, and the mandrel is cleaned and prepared to receive a new bladder for manufacturing another shaft. In some instances a bladder may be reused after its removal.

Alternatively, a mandrel without a hollow end and holes may be covered with a bladder and wrapped with pre-preg material. Before the ply-wrapped mandrel is inserted into the mold, the mandrel is removed and an air fitting is attached. The bladder and plies are then inserted into the mold and pressurized gas is then introduced directly into the bladder through the fitting, inflating the bladder and forcing the composite material against the inner wall(s) of the mold. The material is then cured and cooled, and the bladder removed.

The inflatable bladder is typically a prefabricated sleeve made using a dipping process. A dipping mandrel, typically a shaft of similar configuration to the molding mandrel but without a hollow end or holes, is dipped into material, such as latex. This coats the outer surface of the dipping mandrel with material, which is cured, forming a bladder. The bladder is stripped off of the dipping mandrel and is then ready to be stretched over a molding mandrel.

There are many drawbacks, however, associated with such conventional bladders. For example, the bladder is typically handled multiple times, adding unnecessary steps to the manufacturing process, reducing efficiency and increasing cost. In addition, excessive handling of the bladder increases risk that the bladder may be damaged, e.g., when it is removed from the dipping mandrel, and/or when it is placed on the molding mandrel.

Furthermore, the quality of the shafts produced may be compromised because conventional bladders increase the risk that the resulting shaft will have irregular composite densities or similar structural imperfections. This is due to the bladders, typically made from latex or similar material, having an elastic memory. When the bladder is placed onto the molding mandrel, the latex may be stretched unevenly, creating irregular localized stresses in the bladder. This may include uneven axial stretching along the length of the mandrel, uneven radial stretching along the surface of the mandrel, twisting and/or bunching of the bladder as it is placed on the mandrel or as it is handled after such placement. In addition, a single bladder configuration is frequently used on various molding mandrels which may have a smaller cross-section than the dipping mandrel used to make the bladder, resulting in an ill-fitting bladder. Thus, when the composite material is wrapped onto the mandrel, the bladder may consequently bunch or wrinkle.

Thereafter during the curing process when the bladder is inflated, the latex material will tend to return to a more uniformly stressed shape, such as by untwisting, moving axially or radially, or unfolding wrinkles. The fibers of the composite material will follow the movement of the bladder, changing the density of the fibers unpredictably, and creating a structurally inferior shaft.

Therefore, there is a need for a molding mandrel having a snug, uniformly fitted bladder which provides an improved quality shaft, by minimizing undesirable surface distortions or stresses in the bladder that may shift the fibers of the composite material.

In addition, there is a need for an apparatus and a process for manufacturing composite shafts which involve less handling and therefore provide a more efficient manufacturing process and less expensive finished products.

SUMMARY OF THE INVENTION

The present invention involves a molding mandrel having an inflatable bladder dipped and cured directly thereon, and used to manufacture composite shafts, such as golf club shafts, fishing poles, and/or pool cues, etc. The invention also involves methods of manufacturing such a molding mandrel and methods of manufacturing shafts using such a molding mandrel.

In one aspect, the present invention is directed to an apparatus for manufacturing composite shafts involving a molding mandrel having an inflatable bladder thereon. The molding mandrel comprises a substantially rigid elongate member or rod, preferably a tapered cylindrical body, that has a hollow passage in one end. Preferably, the passage extends axially from the large end or butt section of the mandrel. A plurality of holes are formed (e.g. bored or drilled, etc.) in the peripheral surface of the mandrel around the hollow passage, providing air apertures between the hollow passage and the outer surface of the mandrel. The butt section of the mandrel typically includes a connector, such as a threaded nipple, and preferably includes seals, such as conventional o-rings.

The mandrel also has a substantially uniformly fitted bladder on its outer surface, which is applied using a dipping process, preferably as described below. The bladder comprises a material exhibiting substantial resiliency and flexibility, with latex such as that marketed under the brand name "Vultex" being preferred.

Another aspect of the present invention is directed to the process of manufacturing a molding mandrel having an inflatable bladder dipped and cured directly thereon. A molding mandrel such as that just described is covered with bladder material, such as latex, by dipping the mandrel in a receptacle of liquid material, this material being designed to cure into a substantially resilient, flexible solid sheath or bladder. Prior to dipping, the holes in the mandrel are typically covered with a thin film or coating, such as cellophane tape, to prevent the liquid material from entering the holes and to provide a substantially uniform surface onto which the liquid is applied. After the mandrel is dipped, the bladder material is cured, possibly under ambient or heated conditions.

In a first preferred embodiment, for example, the mandrel is dipped into a liquid latex tank and then is dipped in a second container which contains a coagulant, preferably calcium nitrate and methanol. The mandrel is then set aside for sufficient time for the solvent to flash off, and then dipped again into the latex. After removing the mandrel from the latex tank, the latex bladder may be cured ambiently or at an elevated temperature, preferably being heated at a series of temperatures for predetermined times.

In a second preferred embodiment, a film is first applied to the holes in the mandrel, and then the outer surface of the mandrel is lightly dusted with corn starch, or a similar powder or material which improves the wettability of the surface. The mandrel is dipped in a tank of coagulant, preferably comprising calcium nitrate, deionized water and surfactant, and then set aside to allow the solvent to flash off, preferably under substantially ambient conditions. The mandrel is then dipped in latex, preferably for about one minute, and then set aside again. The mandrel is (preferably repeatedly) dipped again in latex, and then set aside. The bladder is then cured, preferably by heating the mandrel in an oven at a predetermined temperature for a predetermined time. Alternatively, the bladder may be cured under substantially ambient conditions.

The bladder covered mandrel may then be incorporated into a manufacturing process to produce composite shafts. Generally, this involves wrapping plies of pre-preg composite sheet around the bladder covered mandrel and placing the ply-wrapped mandrel in a curing mold having inner wall(s). A source of pressurized gas is connected to the hollow end of the mandrel, communicating with the passage therein. The bladder is inflated to a predetermined pressure which forces the plies of composite material against the inner wall(s) of the mold. The mold is then heated to a predetermined temperature for a sufficient time to allow the resin comprising the plies of pre-preg to fully cure. Alternatively, the wrapped mandrel may be placed in a mold that is at least partially heated, thus initiating the curing of the composite material before the bladder is inflated.

Thereafter, the cured composite shaft is removed from the mold, the mandrel and bladder are removed from the core of the composite shaft, for example by using pressurized gas to separate them. The bladder may be pulled out of the shaft and discarded. The mandrel is then cleaned and prepared for reuse.

The improved quality composite shaft provided is preferably utilized as a shaft for golf clubs using conventional means. In addition, the shaft may be used for other devices, such as pool cues or shafts for fishing rods.

Accordingly, an object of the present invention is to provide an apparatus for manufacturing a shaft made from composite materials, which substantially eliminates the risk of fibers in the composite material becoming substantially misaligned during the manufacturing process.

A further object of the present invention is to provide a process of manufacturing a molding mandrel having a substantially form-fitting, customized, uniform bladder thereon which is used to produce improved quality composite shafts.

Another object is to provide a process of manufacturing a molding mandrel having an inflatable bladder dipped and cured directly thereon, thereby substantially reducing the required steps of bladder manufacturing and shaft molding.

An additional object is to provide a more efficient process for manufacturing shafts, such as those used for golf clubs, yielding a less expensive product having improved quality.

Other objects and features of the present invention will become apparent from consideration of the following description taken in conjunction with the accompanying drawings.

BRIEF DESCRIPTION OF THE DRAWINGS

For a better understanding of the invention, and to show how it may be carried into effect, reference will be made, by way of example, to the accompanying drawings, in which.

DETAILED DESCRIPTION OF THE PREFERRED EMBODIMENTS

Figure 1:
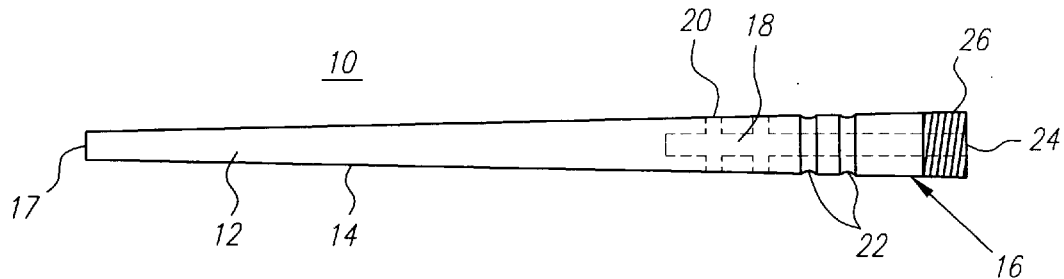
FIG. 1 is a side view of a preferred embodiment of the molding mandrel of the present invention, showing an interior passage in phantom.

Referring to FIG. 1, a preferred embodiment of a molding mandrel 10 in accordance with the present invention is shown. The molding mandrel 10 comprises a substantially rigid cylindrical rod 12 or other elongate member with a proximal end or butt section 16 and a distal end or tip 17, and having a passage 18 therein extending substantially axially from the butt section 16 towards the tip 17. Generally, the passage 18 preferably extends through the rod 12 as far as practicable without substantially compromising the rigidity of the mandrel 10. A plurality of holes 20 are formed (e.g. bored or drilled) in the outer surface 14 of the rod 12, thereby communicating between the passage 18 and the outer surface 14 of the rod 12.

The butt section 16 preferably includes a threaded end 26 having an opening 24 therein communicating with the passage 18. Adjacent to the threaded end 26 are a plurality of o-ring grooves 22 adapted to receive conventional o-ring seals (not shown). Alternatively, the butt section 16 may include other types of connectors which allow an air line or similar source of pressurized gas to be detachably sealably connected to the mandrel 10.

The mandrel 10 is generally provided from conventional materials and configurations known to those reasonably skilled in the art of manufacturing the relevant composite shafts, such as golf club shafts. A preferred material for the mandrel 10 is stainless steel, preferably with rough sand or bead blast outer surface finish. Typically, the rod 12 is a substantially rigid cylindrical rod, having the passage 18 bored into the butt section 16 using conventional methods, although rolled or extruded tubes already including a passage may also be used. Although the preferred embodiment includes a rod having a gradually tapering cross-section, the mandrel 10 may have a substantially nontapered shape appropriate for manufacturing uniformly contoured shafts.

The mandrel 10 has an inflatable bladder (not shown in FIG. 1) dipped and cured directly onto the outer surface 14 of the rod 12. The bladder comprises a substantially resilient, flexible material, preferably a latex such as the brand name "Vultex" available from General Latex of Los Angeles, Calif., and preferably has a substantially uniform thickness. The preferred dipping processes described below provide a desired substantially uniform layer of latex material, resulting in a bladder having typical wall thicknesses ranging from approximately 0.020 inches to 0.035 inches, although thicknesses between about 0.025 inches and 0.030 inches are more preferred, and a thickness of about 0.030 inches is most preferred.

In a first preferred process for applying a bladder to the mandrel 10, uncured liquid bladder material, preferably latex, is provided at substantially ambient temperatures, preferably around 70–80° F., in a tank or container having a configuration adapted to receive the molding mandrel 10 therein. Prior to dipping, the holes 20 on the mandrel 10 may be covered preferably with a thin film or coating (not shown) or plugged to prevent the liquid bladder material from entering the holes 20 and to provide a substantially uniform outer surface 14 onto which the liquid bladder material is applied. Preferably, the holes 20 are overlaid with a film, such as cellophane tape, having a preferred thickness less than about 0.003 inches. The film should have sufficient adhesion to block the holes 20 during the dipping process and a rough, wettable surface texture to hold the coagulant. In addition, the film should release from the holes 20 during the pre-preg curing/bladder inflation process, for example, by losing its adhesive properties above about 200° F. An example of such a film is transparent tape from 3M Co. Conventional o-rings 28 are placed in the recesses 22 on the butt section 16.

The mandrel 10 is dipped in the latex tank until the desired outer surface area 14 is completely immersed, preferably soaking in the tank for about one minute. The mandrel 10 is then removed and allowed to set up, preferably for about one hour, for example by hanging the mandrel 10 vertically from the butt section 16. The mandrel 10 is then dipped in a coagulant, preferably an alcohol-based coagulant such as calcium nitrate and methanol, for less than about one minute. The solvent is allowed to flash off for about 5 minutes (substantially evaporating the alcohol), leaving the calcium nitrate. The mandrel 10 is then dipped again in latex for about one minute, after which it is ready to be cured.

Curing may be accomplished at substantially ambient conditions, preferably at about 65–85° F. for about 48 hours, or by heating the mandrel 10, for example in an oven, for a predetermined time. Preferably, the curing process is accelerated by first hanging the mandrel 10 under substantially ambient conditions for about 1 hour, followed by heating it for about 30 minutes at about 150° F., then for about 30 minutes at about 180° F., and finally for about 30 minutes at about 230° F.

In a second preferred embodiment, a mandrel 10 is provided, film (not shown) is applied to the holes 20 in the mandrel 10, and o-rings 28 are placed in the recesses 22. The outer surface 14 of the mandrel 10 is lightly dusted with corn starch or other similar powders or materials which improve the wettability of the surface of the mandrel and/or the film, that is, to roughen the surface to improve adhesion of the liquid coagulant material thereto. The mandrel 10 is dipped into a tank of coagulant, preferably comprising a water-based coagulant such as calcium nitrate, deionized water and surfactant, for less than about one minute and then set aside for about 10 minutes to allow the solvent to flash off. The mandrel 10 is then dipped in a tank of latex, preferably for about one minute, and then set aside for just under about one minute under substantially ambient conditions. The mandrel 10 is then dipped again in latex for about 15 seconds, and hung for about 45 seconds under substantially ambient conditions. Alternatively, the mandrel 10 may then be dipped again in latex for about 15 seconds, and hung for about 15 minutes under substantially ambient conditions. The mandrel 10 is then heated to cure the bladder, preferably using the series of heating temperatures and times described above. Alternatively, the bladder may be cured under substantially ambient conditions, by hanging the mandrel 10 for about 48 hours.

Figure 2:
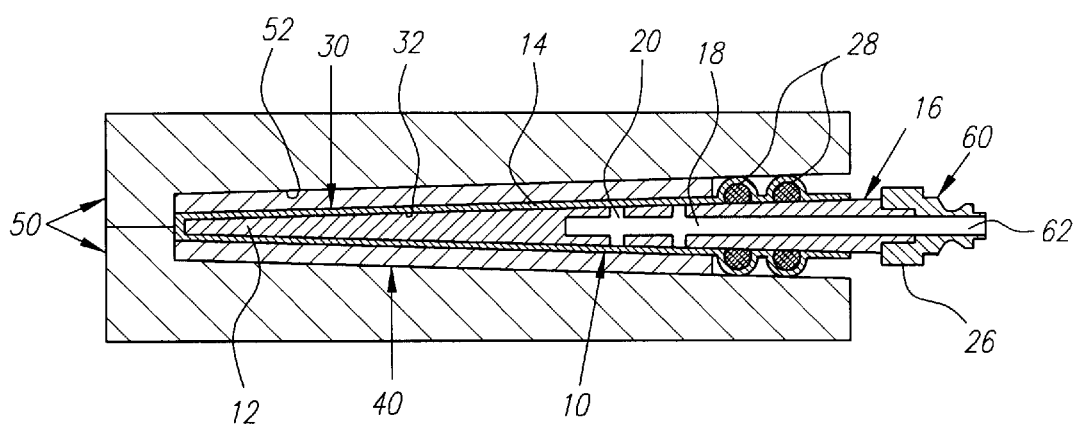
FIG. 2 is a schematic cross-sectional view of a preferred embodiment of the present invention, including a mandrel and bladder wrapped with pre-preg composite material and inserted within a curing mold.

Turning now to FIG. 2, a molding mandrel 10 including a rod 12 having a bladder 30 dipped and cured thereon is shown incorporated into an example of a preferred manufacturing process in accordance with the present invention to produce a composite shaft, such as a shaft for a golf club. Plies of pre-preg composite sheet 40 are wrapped around the mandrel 10 in a predetermined way known to those reasonably skilled in the art. A source of pressurized gas is detachably connected to the butt section 16 of the mandrel 10, communicating with the passage 18 therein. In the preferred embodiment, an air fitting 60 is screwed onto the threaded end 26 of the butt section 16, a passage 62 in the fitting communicating with the passage 18.

The ply-wrapped mandrel, 10 and 40, is placed in a curing mold 50 of conventional construction, including an inner wall(s) 52 having dimensions substantially similar to the desired finished outer dimensions of the shaft being manufactured. Preferably, the mold 50 and the mandrel 10 include cooperating features (not shown) on the proximal ends thereof, such as a cooperating dimple and recess, to prevent axial movement of the mandrel 10 in relation to the mold 50. Alternatively, the mandrel 10 may be clamped or otherwise affixed in the mold 50, such as by engaging the butt section 16 with a mechanical clamp (not shown) or similar device. Once the mandrel 10 is placed in the mold 50, the o-rings 28 on the butt section 16 and the bladder 30 should compressibly engage the inner wall(s) 52 of the mold 50 and the outer surface 14 of the mandrel 10, thereby creating a substantially air tight seal.

Air is then directed through the air fitting 60 into the passage 18, and passes through the holes 20 to the outer surface 14 of the mandrel 10, engaging and moving the film covering the holes 20 away from the outer surface 14 of the mandrel 10. This pressure then contacts the inner surface 32 of the bladder 30, moving the bladder 30 away from the outer surface 14 of the mandrel 10 and pushing the bladder 30 against the composite material 40 wrapped around the bladder 30. Alternatively, the mandrel 10 may be removed from the wrapped plies 40 prior to placing the mandrel 10 in the mold 50 and an air fitting 60 may be connected directly to the bladder 30. When air from the fitting 60 is introduced, it communicates directly with the inner surface of the bladder 30 to inflate it.

As the bladder 30 is inflated to a predetermined pressure, it substantially uniformly forces the plies of composite material 40 against the inner wall(s) 52 of the mold 50. The mold 50 is heated to a predetermined temperature for a sufficient time to allow the resin comprising the plies of pre-preg to fully cure. Alternatively, the mold 50 may be at least partially heated when the wrapped mandrel, 10 and 40, are placed therein. For example, if a single mold 50 is used to cure a number of shafts in a production sequence, the mold 50 may not be completely cooled when a fully cured shaft is removed and an uncured shaft is subsequently placed in the mold 50. Thus, the curing of the composite material 40 may begin before the bladder 30 is inflated, although preferably the mold 50 is cooled to substantially ambient conditions before a new wrapped mandrel, 10 and 40, is inserted.

Thereafter, the pressure is released, the cured composite shaft is removed from the mold, the mandrel 10 (if not removed previously) is removed from the core of the composite shaft, and the bladder 30 is removed. The bladder 30 is discarded, while the mandrel 10 is cleaned and prepared for reuse. In some instances the bladder 30/mandrel 10 combination may be suitable for reuse, and therefore the bladder 30 would not be removed from the mandrel 10.

The appropriate curing conditions for the process just described will be known to those reasonably skilled in the art. Generally, the bladder 30 is inflated to pressures of between about 60 psi and about 300 psi, with pressures around 100 to 150 psi being more preferred, and pressures of about 130 psi being most preferred. Depending upon the type of pre-preg material used, the resin may be cured by heating the mold to temperatures of between about 250° F. and 350° F., preferably between about 250° F. and 300° F. Curing temperatures above 350° F. are disfavored as the latex generally cannot survive temperatures beyond this range. Curing times typically range from a few minutes, for example, in the case of "quick cure" epoxies, to about 1.5 hours for conventional resins. More preferably, quick cure resins may be heated at about 310° F. for about 10 minutes, while conventional resins may be heated at about 250° F. for between about 60 and 90 minutes.

Shafts manufactured using the apparatus and method just described have many applications, most preferably, as golf club shafts. After being cured, the shafts are incorporated into golf clubs using conventional means which will be known to those reasonably skilled in the art. In addition, the shafts may be used for other devices in which composite shafts are desired, such as pool cues for billiards or shafts for fishing poles.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for manufacturing a composite shaft for a golf club, the method comprising:

overlaying a plurality of holes of a mandrel with a thin film to create a mandrel with substantially uniform surface;

forming an inflatable bladder with a uniform surface about the mandrel by dipping the mandrel in a liquid material and allowing the liquid material to cure on the mandrel;

wrapping plies of pre-preg composite sheet about the inflatable bladder on the mandrel;

inflating the bladder to a predetermined pressure through the plurality of holes in the mandrel, the plurality of holes communicating between a passage within the mandrel and an outer surface of the mandrel;

heating the plies of pre-preg composite sheet for a sufficient time to allow a resin comprising the composite sheet to cure to form the composite shaft;

removing the mandrel from the inflatable bladder; and removing the inflatable bladder from the composite shaft.

2. The method according to claim 1 further comprising placing the inflatable bladder and composite sheet thereon in a mold prior to inflating the bladder, the mold having dimensions substantially similar to that of the golf club composite shaft.

3. The method according to claim 1 wherein the liquid material is a latex material.

4. The method according to claim 1 wherein the thin film is a cellophane tape.

5. A method of manufacturing a composite shaft for a golf club, the method comprising:

overlaying a plurality of holes of a mandrel with a thin film to create a mandrel with substantially uniform surface;

forming an inflatable bladder with a uniform surface about the mandrel by dipping the mandrel in a liquid material and allowing the liquid material to cure on the mandrel;

wrapping plies of pre-preg composite sheet about the inflatable bladder on the mandrel;

placing the inflatable bladder with the plies of pre-preg composite sheet thereon in a mold, the mold having dimensions substantially similar to that of the golf club composite shaft;

inflating the bladder to a predetermined pressure to conform the plies of pre-preg composite sheet to the dimensions of the mold;

heating the plies of pre-preg composite sheet within the mold for a sufficient time to allow a resin comprising the composite sheet to cure to form the composite shaft;

removing the mandrel from the inflatable bladder; and removing the inflatable bladder from the composite shaft.

6. The method according to claim 5 wherein removing the mandrel from the inflatable bladder occurs prior to inflating the inflatable bladder.

7. The method according to claim 6 wherein inflating the inflatable bladder to a predetermined pressure comprises flowing pressurized air from a source and into the inflatable bladder.

8. The method according to claim 5 wherein inflating are inflatable bladder to a predetermined pressure comprises inflating the inflatable bladder through the plurality of holes in the mandrel, the plurality of holes communicating between a passage within the mandrel and an outer surface of the mandrel.

9. The method according to claim 8 wherein the inflating the bladder comprises:

flowing pressurized air from a source through the passage of the mandrel; and, flowing the pressurized air from the passage through the plurality of holes and into the inflatable bladder.

10. The method according to clam 5 wherein the forming an inflatable bladder on a mandrel comprises:

dipping the mandrel in a latex material;

dipping the mandrel in a coagulant material;

dipping the mandrel in a latex material a second time after dipping in the coagulant material; and curing the latex material on the mandrel.

11. The method according to claim 5 wherein the forming an inflatable bladder on a mandrel comprises:

dusting a surface of the mandrel with a corn starch material;

dipping the mandrel in a coagulant material comprising calcium nitrate, deionized water and a surfactant;

dipping the mandrel in a latex material after dipping in the coagulant material; and dipping the mandrel in a latex material a second time;

heating the mandrel to cure the latex material on the mandrel.

12. The method according to claim 5 wherein the inflatable bladder has a wall thickness of 0.02 inches.

* * * * *